(12) United States Patent
Compel et al.

(10) Patent No.: US 10,487,181 B2
(45) Date of Patent: Nov. 26, 2019

(54) REVERSIBLE METALLOPOLYMER NETWORK

(71) Applicant: COLORADO STATE UNIVERSITY RESEARCH FOUNDATION, Fort Collins, CO (US)

(72) Inventors: William Scott Compel, Fort Collins, CO (US); Christopher J. Ackerson, Fort Collins, CO (US); O. Andrea Wong, Madison, WI (US)

(73) Assignee: Colorado State University Research Foundation, Fort Collins, CO (US)

( * ) Notice: Subject to any disclaimer, the term of this patent is extended or adjusted under 35 U.S.C. 154(b) by 214 days.

(21) Appl. No.: 15/368,232

(22) Filed: Dec. 2, 2016

(65) Prior Publication Data
US 2017/0158824 A1   Jun. 8, 2017

Related U.S. Application Data

(60) Provisional application No. 62/262,061, filed on Dec. 2, 2015, provisional application No. 62/309,205, filed on Mar. 16, 2016.

(51) Int. Cl.
| | |
|---|---|
| *C08G 79/00* | (2006.01) |
| *C08J 3/075* | (2006.01) |
| *C09D 11/52* | (2014.01) |
| *C09J 9/02* | (2006.01) |
| *C09J 185/00* | (2006.01) |
| *H01B 1/02* | (2006.01) |
| *H01M 10/0525* | (2010.01) |
| *H01M 10/0565* | (2010.01) |
| *H01M 10/052* | (2010.01) |
| *H01M 10/056* | (2010.01) |

(52) U.S. Cl.
CPC .............. *C08G 79/00* (2013.01); *C08J 3/075* (2013.01); *C09D 11/52* (2013.01); *C09J 9/02* (2013.01); *C09J 185/00* (2013.01); *H01B 1/02* (2013.01); *H01M 10/052* (2013.01); *H01M 10/056* (2013.01); *H01M 10/0525* (2013.01); *H01M 10/0565* (2013.01); *C08G 2210/00* (2013.01); *C08J 2385/00* (2013.01); *H01M 2300/0085* (2013.01); *H01M 2300/0088* (2013.01)

(58) Field of Classification Search
CPC .... C08G 79/00; C08G 2210/00; C09D 11/52; C09J 185/00; C09J 9/02; H01B 1/02; C08J 2385/00; C08J 3/075; H01M 2300/0085; H01M 2300/0088; H01M 10/0525; H01M 10/0565; H01M 10/056; H01M 10/052
USPC ................................................ 252/514, 512
See application file for complete search history.

(56) References Cited

U.S. PATENT DOCUMENTS

| | | | | |
|---|---|---|---|---|
| 8,153,156 | B2 * | 4/2012 | Ravi | A61K 9/0048 424/489 |
| 9,683,992 | B2 * | 6/2017 | Compel | G01N 33/54346 |
| 2007/0269594 | A1 * | 11/2007 | Ackerson | B22F 1/0018 427/216 |
| 2011/0280914 | A1 | 11/2011 | Prestwich et al. | |
| 2011/0313059 | A1 * | 12/2011 | Blosi | B01J 13/0043 516/97 |
| 2013/0277625 | A1 * | 10/2013 | Srinivas | H01B 1/02 252/514 |
| 2014/0329267 | A1 * | 11/2014 | Odriozola | C08G 65/326 435/29 |
| 2015/0037585 | A1 | 2/2015 | Compel et al. | |

FOREIGN PATENT DOCUMENTS

WO    WO-2010087912 A1 *  8/2010  ............. A61L 27/38

OTHER PUBLICATIONS

Chevrier, I. et al., "Rings, Chains and Helices: New Antimicrobial Silver Coordination Compounds With (ISO-)Nicotinic Acid Derivatives," Dalton Trans., 2013, 42, 217-231.

Lavenn, C. et al., "A Luminescent Double Helical Gold(I)-Thiophenolate Coordination Polymer Obtained by Hydrothermal Synthesis or by Thermal Solid-State Amorphous-To-Crystalline Isomerization," Journal of Materials Chemistry C, 2015, 3, 4115-4125.

Liu, Y. et al., "Silver(I)-Glutathione Biocoordination Polymer Hydrogel: Effective Antibacterial Activity and Improved Cytocompatibility," Journal of Materials Chemistry, 2011, 21, 19214-19218.

Mandai, T. et al., "Extraordinary Aluminum Coordination in a Novel Homometallic Double Complex Salt," Dalton Trans., 2015, 44, 11259-11263.

Mishra, S. et al., "Novel Heterometal-Organic Complexes as First Single Source Precursors for Up-Converting NaY(Ln)F4(Ln=Yb, Er, Tm) Nanomaterials," Dalton Trans., 2012, 41, 1490-1502.

Shen, J-S. et al., "Highly Selective Iodide-Responsive GEL-SOL State Transition in Supramolecular Hydrogels," Journal of Materials Chemistry, 2009, 19, 6219-6224.

(Continued)

*Primary Examiner* — Douglas J MC Ginty
(74) *Attorney, Agent, or Firm* — Haukaas Fortius PLLC; Michael H. Haukaas

(57) ABSTRACT

The invention provides a metallopolymer coordination network comprising one or more coinage or similar metals and a glyme or glyme-equivalent. The composition has an amorphous polymer network that is significantly stronger than previously reported supramolecular hydrogels synthesized without glyme. Glyme chain length and water content strongly influence the mechanical, electronic, and optical behavior of the network.

21 Claims, 11 Drawing Sheets

(56) References Cited

OTHER PUBLICATIONS

Taynton, P. et al., "Heat—or Water-Driven Malleability in a Highly Recyclable Covalent Network Polymer," Advanced Materials, 2014, 26, 3938-3942.
Che et al., "Homoleptic Copper(I) Arylthiolates as a New Class of p-type Charge Carriers: Structures and Charge Mobility Studies," Chemistry, 14(10):2965-2975, Mar. 2008.
Odriozola et al., "Gold—glutathione Supramolecular Hydrogels," J Mater. Chem., 17:4843-4845, Oct. 2007.
Sarkar et al., "Redox-Switchable Copper(I) Metallogel: A Metal-Organic Material for Selective and Naked-Eye Sensing of Picric Acid," ACS Appl. Mater. Interfaces, 6(9):6308-6316, Apr. 2014.

\* cited by examiner

Fig. 1A-B

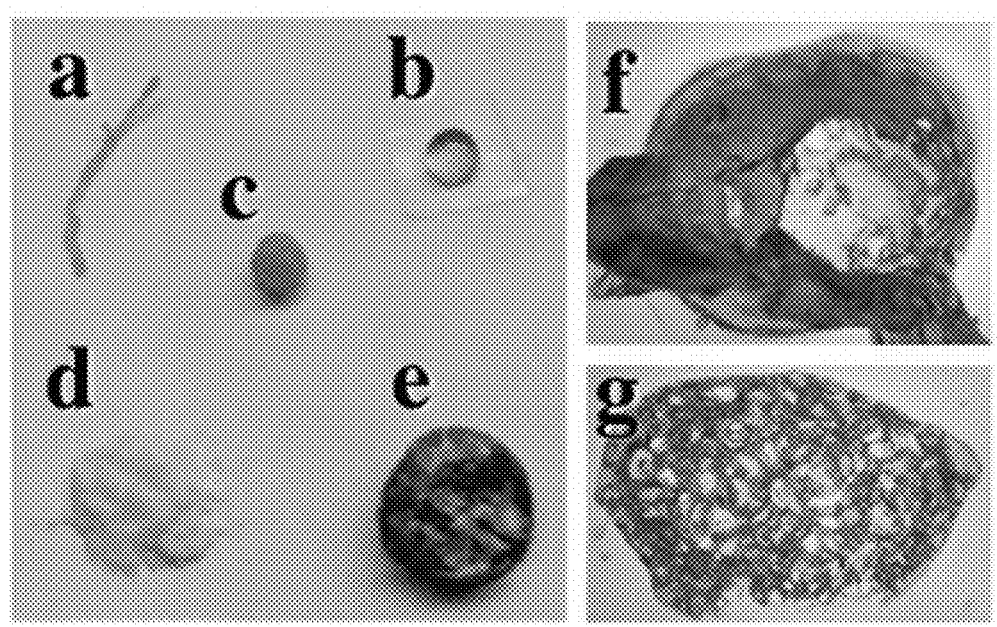
Fig. 3A-G

Fig. 6A-C

A
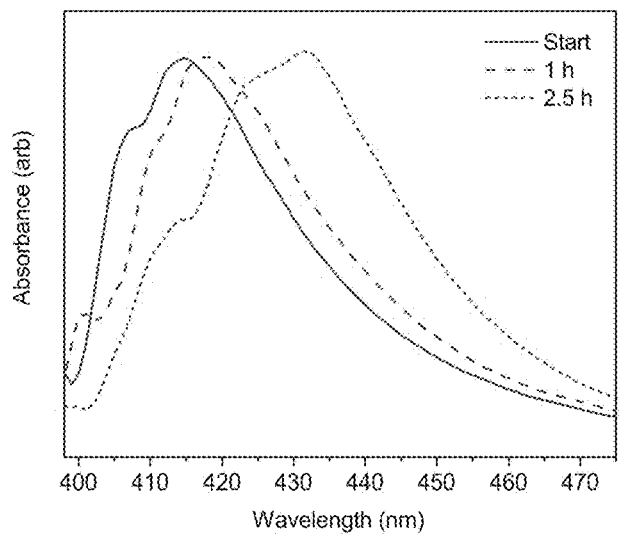
B
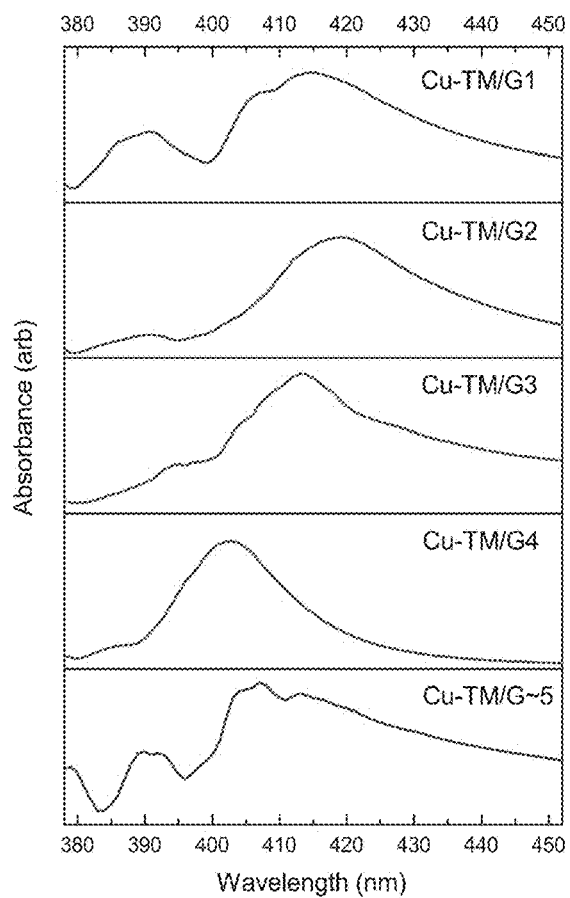
Fig. 10A-B

A
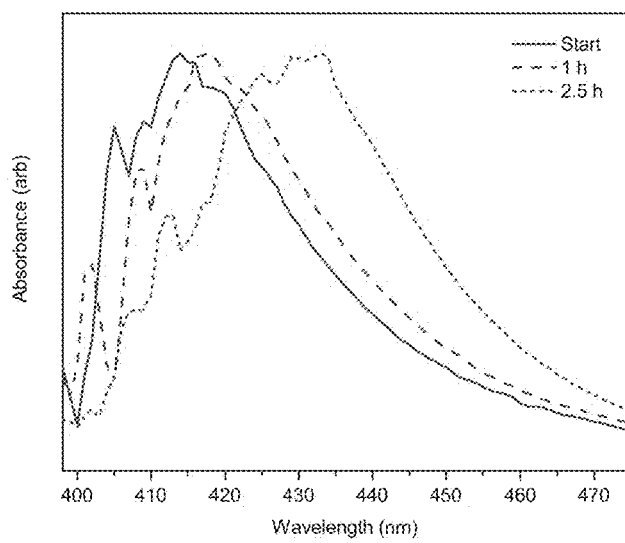
B
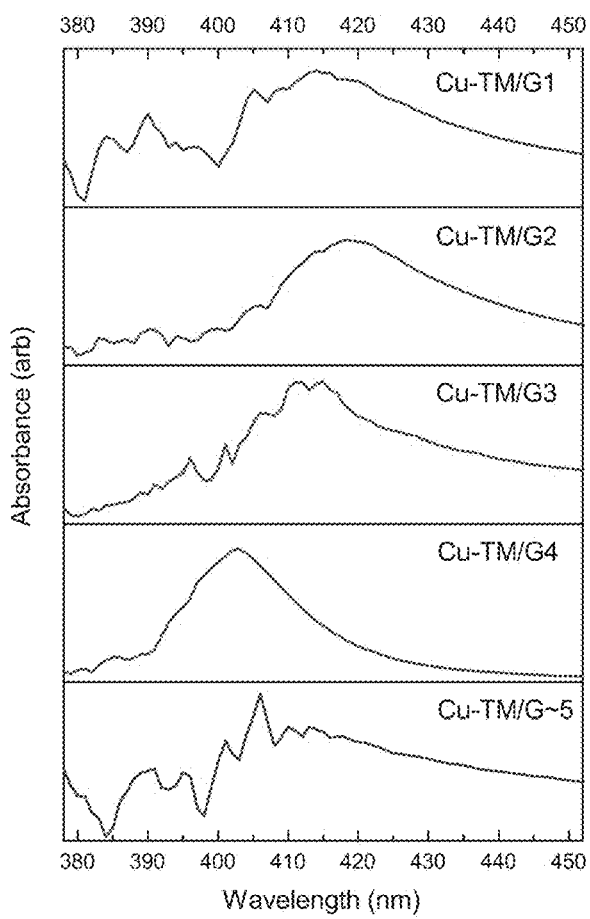
Fig. 11A-B

REVERSIBLE METALLOPOLYMER NETWORK

RELATED APPLICATIONS

This application claims priority under 35 U.S.C. § 119(e) to U.S. Provisional Patent Application Nos. 62/309,205 filed Mar. 16, 2016 and 62/262,061 filed Dec. 2, 2015, which applications are incorporated herein by reference.

GOVERNMENT SUPPORT

This invention was made with government support under Grant No. R21 EB014520 awarded by the National Institutes of Health. The government has certain rights in the invention.

BACKGROUND OF THE INVENTION

Gels are soft materials comprised of two coexisting phases: a solid component (gelator) that immobilizes a fluid component by surface tension. The gelator molecules can self-assemble to span the entire sample in a continuous, cross-linked network. In contrast to chemical gels where the gelator is covalently linked through the entire system, physical gels interact non-covalently and can form reversible gels. The introduction of metal to the gelator provides alternative binding sites to design and construct complex network architectures. The diverse metal-ligand coordination environments that induce the self-assembly process influence gel properties. The resulting "metallogels" have garnered ever-increasing interest in the fields of coordination polymer gels and supramolecular polymer gels. Metallogels are highly versatile materials with a wide range of applications in sensors, nanodevices, drug delivery, catalysis, and cosmetics.

Coinage metals (e.g., Cu, Ag, and Au) react with thiols to form straight-chain polymers of 1:1 M(I):SR stoichiometry. These complexes are precursors for functional materials including metal nanoparticles and supramolecular hydrogels. In various supramolecular hydrogels, metallophilic interactions drive self-assembly into two-dimensional (2D) sheets that stack in the third dimension to form lamellar structures. These gels are currently studied for their potential applications in medicine, adhesives, and sensing. However, current metallogels require various additives to regenerate after dehydration. The development of a reversible metallogel that could be regenerated with only water would provide a broad range of additional applications and advantages.

SUMMARY

A metallopolymer coordination network forms when organic molecules coordinate to metal in the backbone of a metallopolymer. Changing the size, composition, and shape of either molecule alters coordination geometry and shapes the molecular network, which provides control over electronic, mechanical, optical, and physiochemical properties of the material. Rheological behavior is highly dependent on water content, and the material can adopt a variety of solid forms depending on how and to what extent water is removed. Rehydrating the vitrified material forms the gel phase, granting the material unique healing capabilities.

The invention provides a reversible metallopolymer coordination network of hard block (e.g., polycarboxylate) and soft block (e.g., polyethylene oxide) polymers that are crosslinked by hydrogen bonds in water. The viscoelastic fluid can be vitrified to multiple physical morphologies, and the resulting resin is water soluble, granting the material the ability to self-heal. Bulk properties of the material are tuned by varying length, shape, and composition of the polymers as well as the vitrification process.

The invention thus provides a reversible metallopolymer coordination network in the form of a metallogel. The metallopolymer backbone (or "hard block") of the metallogel can be a coinage metal-based polymer linked by a sulfur-containing amino acid or other small molecule. The fluid phase (or "soft block") of the metallogel can be a small molecule or polymer having a series of lone pairs of electrons for chelation, for example, polyethylene oxide and/or polycarboxylate, which coordinate with the coinage metal to form chelate moieties of the metallogel.

In some embodiments, the soft block comprises a glyme or polycarboxylate. In another embodiment, the soft block comprises a glyme alternative such as a compound of Formula A or B (described below), for example, tetramethylethylenediamine (TEMED) or a derivative thereof. In one specific embodiment, the soft block comprises monoglyme (dimethoxyethane).

Accordingly, the invention provides a metallopolymer coordination network composition comprising a metallopolymer coordinated to one or more compounds of Formula A:

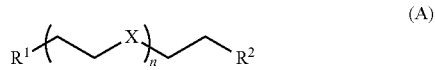

(A)

wherein
X is O or NR' wherein R' is H, alkyl, aryl, alkenyl, alkynyl, aromatic heterocycle, or non-aromatic heterocycle;
$R^1$ and $R^2$ are each independently OH, alkoxy, or $N(R^a)_2$ wherein each Re is independently H or $(C_1\text{-}C_8)$alkyl; and
n is 1, 2, 3, 4, or about 5 to about 50;
wherein the metallopolymer is a polymer of coinage metal atoms linked together by sulfur groups of molecules comprising a carboxy or amino functional group, and the composition is water soluble and electrically or ionically conductive.

In one embodiment, the composition further comprises water. Such compositions are therefore reversible aqueous gels. The gel has non-lamellar properties which can be restored after rehydration of the dehydrated gel. The composition has metal coordination sites for one or more of the coinage metal atoms which can be partially saturated, or saturated with moieties of Formula A. The elasticity of the gel ranges from about 15 MPa to about 40 MPa.

The molecules comprising the sulfur groups linking the coinage metals can be sulfur-containing diacids, amino acids, dipeptides, tripeptides, oligopeptides, or polypeptides. Preferably, the molecule comprises a carboxy functionality or an amino functionality. In certain specific embodiments, the sulfur groups linking the coinage metals comprise thiomalic acid, glutathione, cysteine, or thioacetic acid.

In some embodiments, the compound of Formula A is 1,2-dimethoxyethane, diethylene glycol dimethyl ether, triethylene glycol dimethyl ether, tetraethylene glycol dimethyl ether, polyethylene glycol having an Mn of about 200-400, monomethyl polyethylene glycol having an Mn of about 200-400, dimethyl polyethylene glycol having an Mn of about 200-400, 1,4-dioxane, or tetramethylethylenediamine (TEMED).

The composition can include a complex of Formula IG:

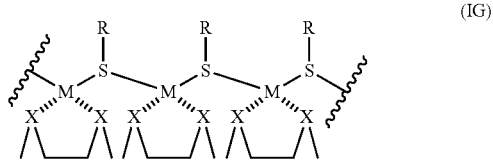

wherein
each M is copper, gold, or silver;
each R is a sulfur-containing molecule wherein its sulfur atom is shown bonded to M groups of Formula IG; and
X is O or NMe; or wherein two or more moieties containing X form a group coordinated to the metals of the metallopolymer. The composition is water soluble and can be electrically or ionically conductive In some embodiments, M is copper. In other embodiments, M is gold. In yet other embodiments, M is silver.

In certain specific embodiments, R—S is thiomalic acid, glutathione, cysteine, or thioacetic acid.

In one specific embodiment, X is O. In another specific embodiment, X is NMe.

In one embodiment, the composition comprises about 40 wt % to about 60 wt % water, wherein the composition is a viscous fluid. In another embodiment, the composition comprises about 15 wt % to about 40 wt % water, wherein the composition is a stable gel. In yet another embodiment, the composition comprises about 0.1 wt % to about 15 wt % water, wherein the composition is an amorphous solid.

In other embodiments, the elasticity of the metallopolymer is modified by additives in the composition, wherein the additive is bipyridine, phenanthroline, neocuproine, or polyvinyl alcohol.

The invention also provides a composition prepared by combining a metallopolymer having carboxy or amino functional groups, or a combination thereof, and a molar excess of glyme, or a molar excess of a nitrogen-glyme equivalent, in water, to provide a metallopolymer coordination network composition wherein the composition is a non-lamellar gel.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

FIG. 3A-G. Pictures of Cu-TM/G1 in various solid forms: (a) wire, (b) gel, (c) hard sphere, (d) powder, (e) rigid puck, (f) hollow sphere, and (g) foam.

FIG. 10A-B. Smoothed linear absorption (a) of Cu-TM/G1 while drying and (b) comparison between Cu-TM/Gn.

FIG. 11A-B. Raw linear absorption (a) of Cu-TM/Gn while drying and (b) comparison between Cu-TM/Gn. Data presented in FIG. 7-10 were smoothed under Savitzky-Golay method with a 10-point window.

DETAILED DESCRIPTION

Figure 1:
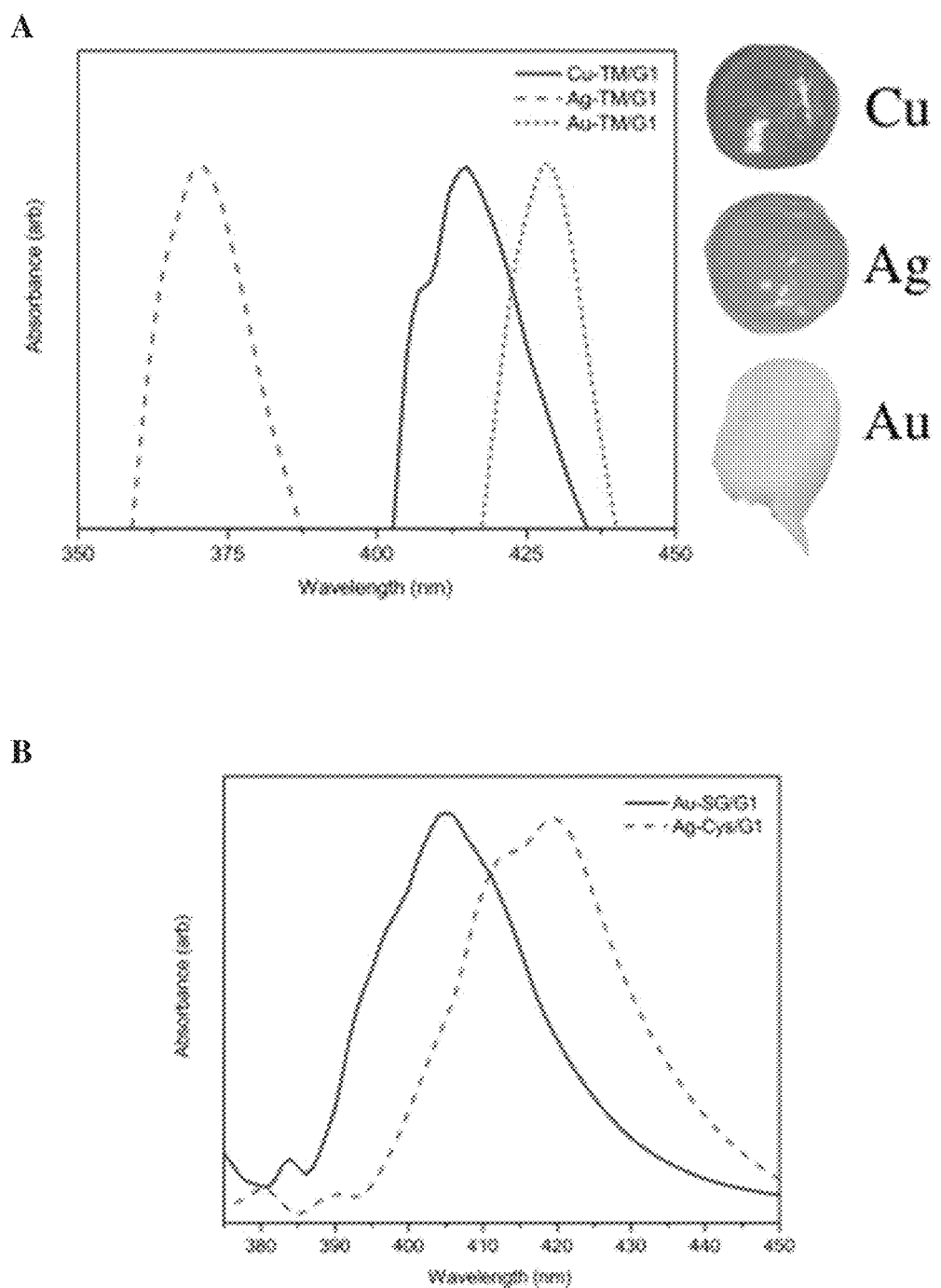
FIG. 1A-B. Linear absorption of samples prepared from reagents listed in Table 1. (a) Comparison of peak absorbance between materials made with Cu, Ag, and Au, along with pictures of each material; (b) gold-glutathione (Au-SG) and silver-cysteine (Ag-Cys) as examples of materials made with other thiols. Data presented were smoothed under Savitzky-Golay method with a 10-point window.

We have developed a novel and highly modular metallopolymer coordination network. It consists an organic molecule (containing carbon, oxygen, and nitrogen) and one inorganic molecule (containing metal atoms). The organic molecule may be simple or complex, and may be a small molecule or a polymer. The small molecules and/or polymers interact and form a mesh that is capable of trapping water through physical forces. The amount of trapped water dictates how much the polymers interact and consequently controls the properties of the polymer.

For instance, at 50% water the material is viscous like honey; at 20% water it forms a gel similar to hair gel; at 0-10% water it forms thin films, hard plastics, porous foams, or powders, depending on how the material is shaped while drying. Extrusion into alcohols can form wires, spheres, and other molded shapes. The resulting solids are incredibly rigid and are comparable to conventional engineering plastics and rubbers. The solid phases can be rehydrated, either partially or wholly, to reform the gel or viscous phases, which is a novel healing mechanism suitable for maintaining and recycling plastics. The material is also very stable in the solid form as long as it remains dry.

The material's properties are easily altered by changing the composition of the polymers. The metal atom strongly influences material color and is expected to change rigidity (through metal-oxygen bonding) and electrical conductivity. Changing the organic polymer chain length alters the rigidity of the material and has a minor effect on visible absorbance. A combination of these simple changes provides for a material with properties that can be tuned for specific applications. Changing other reagents, such as thiol (thiomalic acid, glutathione, cysteine, and the like) and base (lithium hydroxide, sodium hydroxide, and ammonium hydroxide, and the like), also provides an additional degree of tunability. Suitable materials for preparing the materials described herein include coinage metals (copper, silver, and gold) and thiols because they form a straight-chain polymer and interact with the organic polymer through metal-oxygen coordination.

Therefore, described herein is a new approach for binding metallopolymers through unique interpolymer interactions to form a metallopolymer coordination network capable of immobilizing water to form a gel. In one system described herein, coinage metal-thiolate polymers and glyme are mixed in aqueous media to form dative metal-oxygen bonds between polymers. The conductivity and optical absorption of the resultant materials originate in the metallopolymer. Glymes act as bridges between metallopolymers, which dictates the distance between neighboring metallopolymers to further shape material properties. Water can penetrate and expand the polymer network to further increase metallopolymer separation. This control over network architecture allows the bulk material to adopt a variety of solid shapes.

The materials have unique optical, electronic, and mechanical properties dependent on composition and metallopolymer spacing. Increasing glyme chain length results in a more flexible network and a softer material. Wet gels change color as they dry because the network contracts to bring metallopolymers closer together. Perhaps most interesting is that the material appears to be either electrically or ionically conductive depending on metallopolymer spacing. A contracted network gathers metallopolymers in close contact and improves electrical conductivity, while an expanded network separates metallopolymers and allows ions to flow freely. The type of conductivity is thus chosen for specific applications by shaping network architecture. These unique structure-dependent properties enable new applications as detailed below.

While the material is inherently conductive, it also acts as a water-soluble adhesive. Together with the ability to adopt a large variety of solid forms, this provides potential applications in electrically conductive adhesives, battery electrolytes, circuitry, electrical contacts, conductive inks, and transparent conductors.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14th Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, the composition, or the embodiment. The terms "about" and "approximately" can also modify the end-points of a recited range as discussed above in this paragraph.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to bring about a recited effect, such as an amount of a reagent necessary to form a product in a reaction mixture. Determination of an effective amount is typically within the capacity of persons skilled in the art. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "substantially" as used herein, is a broad term and is used in its ordinary sense, including, without limitation, being largely but not necessarily wholly that which is specified.

The term, number average molecular weight (Mn), is given its normal meaning wherein Mn is defined as the quotient of total sample weight divided by the total number of polymer molecules.

The term "alkyl" refers to a branched or unbranched hydrocarbon having, for example, from 1-20 carbon atoms, and often 1-12, 1-10, 1-8, 1-6, or 1-4 carbon atoms. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (1-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like.

The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 20 carbon atoms, for example, about 6-10 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like.

The term "heterocycle" refers to a saturated or partially unsaturated ring system, containing at least one heteroatom selected from the group oxygen, nitrogen, silicon, and sulfur, and optionally substituted with one or more groups as defined for the term "substituted". A heterocycle can be a monocyclic, bicyclic, or tricyclic group. A heterocycle group also can contain an oxo group (=O) or a thioxo (=S) group attached to the ring. Non-limiting examples of heterocycle groups include 1,3-dihydrobenzofuran, 1,3-dioxolane, 1,4-dioxane, 1,4-dithiane, 2H-pyran, 2-pyrazoline, 4H-pyran, chromanyl, imidazolidinyl, imidazolinyl, indolinyl, morpholinyl, piperazinyl, piperidinyl, pyrazolidinyl, pyrazolinyl, pyrrolidine, pyrroline, quinuclidine, tetrahydrofuranyl, and thiomorpholine.

Aromatic heterocycles can be referred to as heteroaryl groups. The term "heteroaryl" refers to a monocyclic, bicyclic, or tricyclic ring system containing one, two, or three aromatic rings and containing at least one nitrogen, oxygen, or sulfur atom in an aromatic ring. The heteroaryl can be unsubstituted or substituted, for example, with one or more, and in particular one to three, substituents, such as alkyl, halo, or hydroxyl groups. Typical heteroaryl groups contain 2-20 carbon atoms in the ring skeleton in addition to the one or more heteroatoms. Examples of heteroaryl groups include, but are not limited to, 2H-pyrrolyl, furanyl, imidazolyl, indolyl, pyranyl, pyrazolyl, pyridyl, pyrimidinyl, pyrrolyl, quinolyl, thiazolyl, thienyl, triazolyl, tetrazolyl, and xanthenyl. In one embodiment the term "heteroaryl" denotes a monocyclic aromatic ring containing five or six ring atoms containing carbon and 1, 2, 3, or 4 heteroatoms independently selected from non-peroxide oxygen, sulfur, and N(Z) wherein Z is absent or is H, O, alkyl, aryl, or ($C_1$-$C_6$) alkylaryl. In some embodiments, heteroaryl denotes an ortho-fused bicyclic heterocycle of about eight to ten ring atoms derived therefrom, particularly a benz-derivative or one derived by fusing a propylene, trimethylene, or tetramethylene diradical thereto.

It will be appreciated that the compounds of the invention can contain asymmetrically substituted atoms, such as, asymmetrically substituted carbon atoms, asymmetrically substituted sulfur atoms, asymmetrically substituted metal atoms, or any combination thereof. All chiral, diastereomeric, racemic forms and all geometric isomeric forms of a structure are part of this disclosure. For example, a metallopolymer composition can comprise an (R)-cysteine substituent, an (S)-cysteine substituent, or both.

As used herein, a "thiol" refers to an organic compound that includes at least one "—SH" group, which is typically a primary or secondary thiol group, and which can be used as a coinage metal ligand. The thiol can be a water-soluble thiol or organic-soluble thiol. Preferably, the thiol molecule also includes a carboxylic acid or amine moiety.

Examples of suitable water-soluble thiols include, but are not limited to, glutathione, cysteine, captopril, thiomalic acid (mercaptosuccinic acid), N-(2-mercaptopropionyl)glycine, p-mercaptobenzioc acid, m-mercaptobenzoic acid, penicillamine, $(C_2-C_7)$mercaptoalkanoic acids such as 6-mercaptohexanoic acid, and the like.

Examples of suitable organo-soluble thiols include, but are not limited to, 2-phenylethanethiol (PET), 1-phenylethanethiol, benzyl mercaptan, thiophenol, $(C_1-C_{18})$alkylthiols such as methanethiol, isopropyl thiol, t-butyl thiol, hexanethiol and dodecanethiol, $(C_8-C_{18})$mercaptoalkanoic acids such as 11-mercaptoundecanoic acid, $(C_3-C_8)$mercaptocycloalkanes such as cyclohexanethiol, dimercaptosuccinic acid, 2-mercaptoethanol, 3-mercaptopropanol, 3-mercaptopropane-1,2-diol (2,3-dihydroxypropyl-mercaptan; thioglycerol), 1-adamantanethiol, 1-naphthalenethiol, 2-naphthalenethiol, camphorthiol, and the like. Some organo-soluble thiols such as those having a carboxylic acid functionality may become water soluble at high pH (e.g., above about 7, above about 7.5, or above about 8). Organo-soluble thiol derivatives having carboxy or amino functionalities related to the thiols of this paragraph are commercially available or can be prepared synthetically, for use as the thiols of the compositions described herein.

Thiolates typically comprise about 1-30 carbon atoms and may have a wide variety of functional or substituent groups such as oxo (e.g., carbonyl, aldehyde, or ketone) moieties, carboxylic acids, anhydride moieties, ester moieties, amide moieties, cyano, nitro, inorganic acid derivatives (e.g., phospho and boro acids and derivatives) and their sulfur and amino analogs, including I°, II°, III°, and IV° amines, zwitterionic moieties, and various substituents where the substituents may be hydrocarbon or substituted hydrocarbon, as well as carbocyclic and heterocyclic, with functional groups coming within the groups set forth above, as well as nitrogen derivatives, such as azo, azoxy, and diazo, organic and inorganic salts of the above ions, and the like. Complex thiolates may be used, both naturally occurring and synthetic, including oligomers, e.g., oligopeptides, of from about 2 to 30 units, thio analogs of purines, pyrimidines, nucleotides and nucleosides, aptamers, and amide linked nucleic acid analogs.

In some embodiments, the thiolates can be monomercapto thiolates including thiol substituted carboxylic acids, e.g., p-mercaptobenzoic acid, and other mercaptoaromatic carboxylic acids of from 5 to 20, usually 7 to 20, carbon atoms and from 0 to 4 heteroatoms, carbocyclic or heterocyclic, generally having from 5 to 6 annular members, as well as being optionally substituted by the above indicated groups, that may be present as annular atoms or as substituents, mercaptoalkanoic acids of from 3 to 20 carbon atoms, where the mercapto group is distant from the carboxy group, being separated by at least 2 carbon atoms, for a 1-carboxy compound, at least at the 3-carbon, amino acids, e.g., cysteine, mercaptobenzonitriles, tiopronin, glutathione, CoA, thiosugars, and the like. In some embodiments, one thiolate will be preferred to another and various stabilities may be obtained depending upon the particular thiolate used.

Glutathione (GSH) is a thiol and a naturally occurring and readily available tripeptide. The tripeptide has a gamma peptide linkage between the carboxyl group of a glutamate side-chain and the amine group of cysteine, which is attached by normal peptide linkage to a glycine.

As used herein, the term "glyme" refers to a glycol ether. One representative example is dimethoxyethane. "Diglyme" refers to diethylene glycol dimethyl ether. Additional glymes include triglyme (triethylene glycol dimethyl ether) and tetraglyme (tetraethylene glycol dimethyl ether).

Glycol ethers can have, for example, a hydroxyl group, an alkyl group, or an ester group as a terminal group, while the other terminal group is typically an alkyl or phenyl group, but can also be a hydroxyl group. Examples of hydroxy-terminated glycol ethers include ethylene glycol monomethyl ether (2-methoxyethanol, $CH_3OCH_2CH_2OH$), ethylene glycol monoethyl ether (2-ethoxyethanol, $CH_3CH_2OCH_2CH_2OH$), ethylene glycol monopropyl ether (2-propoxyethanol, $CH_3CH_2CH_2OCH_2CH_2OH$), ethylene glycol monoisopropyl ether (2-isopropoxyethanol, $(CH_3)_2CHOCH_2CH_2OH$), ethylene glycol monobutyl ether (2-butoxyethanol, $CH_3CH_2CH_2CH_2OCH_2CH_2OH$), ethylene glycol monophenyl ether (2-phenoxyethanol, $C_6H_5OCH_2CH_2OH$), ethylene glycol monobenzyl ether (2-benzyloxyethanol, $C_6H_5CH_2OCH_2CH_2OH$), diethylene glycol monomethyl ether (2-(2-methoxyethoxy)ethanol, methyl carbitol, $CH_3OCH_2CH_2OCH_2CH_2OH$), diethylene glycol monoethyl ether (2-(2-ethoxyethoxy)ethanol, carbitol cellosolve, $CH_3CH_2OCH_2CH_2OCH_2CH_2OH$), and diethylene glycol mono-n-butyl ether (2-(2-butoxyethoxy)ethanol, butyl carbitol, $CH_3CH_2CH_2CH_2OCH_2CH_2OCH_2CH_2OH$). Examples of dialkyl ether glycol ethers include ethylene glycol dimethyl ether (dimethoxyethane, $CH_3OCH_2CH_2OCH_3$), ethylene glycol diethyl ether (diethoxyethane, $CH_3CH_2OCH_2CH_2OCH_2CH_3$), and ethylene glycol dibutyl ether (dibutoxyethane, $CH_3CH_2CH_2CH_2OCH_2CH_2OCH_2CH_2CH_3$). Examples of ester-terminated glycol ethers include ethylene glycol methyl ether acetate (2-methoxyethyl acetate, $CH_3OCH_2CH_2OCOCH_3$), ethylene glycol monoethyl ether acetate (2-ethoxyethyl acetate, $CH_3CH_2OCH_2CH_2OCOCH_3$), ethylene glycol monobutyl ether acetate (2-butoxyethyl acetate, $CH_3CH_2CH_2CH_2OCH_2CH_2OCOCH_3$), and propylene glycol methyl ether acetate (1-methoxy-2-propanol acetate).

Glymes further include polyethylene glycols of various lengths, for example, the compounds of Formula A:

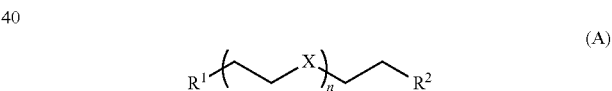

(A)

wherein X is O; $R^1$ and $R^2$ are each independently OH, OMe, OEt, SH, SMe, SEt, $NH_2$, NHMe, $NMe_2$, NHEt, $NEt_2$, $PH_2$, PHMe, $PMe_2$, PHEt, or $PEt_2$; and n is 1, 2, 3, 4, or about 5 to about 50 (e.g., PEG 400, and the like).

Additionally, various glyme alternatives (or glyme 'equivalents') can be used as part of the soft block for preparing metallogels, such as bipyridine, phenanthroline, neocuproine, polyvinyl alcohol, or the compounds of Formula B:

(B)

wherein

X is O, S, $CH_2$, NH, NR' wherein R' is as defined for Formula A, or PH;

$R^1$ and $R^2$ are each independently OH, OMe, OEt, SH, SMe, SEt, $NH_2$, NHMe, $NMe_2$, NHEt, $NEt_2$, $PH_2$, PHMe, $PMe_2$, PHEt, or $PEt_2$; and n is 1, 2, 3, 4, or about 5 to about 50 (e.g., PEG 400, and the like).

A "metallogel" is a metal-containing physical gel that has two coexisting phases: (1) a solid component (gelator) that immobilizes (2) a fluid component by surface tension, wherein the gelator molecules can self-assemble to span the entire sample in a substantially continuous, cross-linked network. The two phases interact non-covalently and can result in a reversible gel. The metal-containing gelator provides alternative binding sites for the fluid component.

The composition of the metallogel in this disclosure comprises a metallopolymer coordination network which, in various embodiments, has a non-lamellar structure (non-sheet forming structure, due in part to the amorphous nature of the disclosed metallopolymer) resulting in its resistance to shearing. In some embodiments, the metallogel is capable of immobilizing water to form a non-lamellar aqueous gel with improved elasticity such that the elasticity of the metallogel can range from about 5 MPa to about 100 MPa, for example, about 15 MPa to about 40 MPa, or about 25 MPa to about 35 MPa. The improvement in elasticity arises, for example, from the glycol units in the metallogel's composition.

Glycol moieties, for example, form a coordination complex with a central atom or ion, which is usually metallic and is called the coordination center. The surrounding array of bound molecules or ions are in turn known as ligands or complexing agents. Ligands are generally bound to the central atom by a coordinate bond (donating electrons from a lone electron pair into an empty metal orbital, also known as a dative bond, represented by a hatched or dashed line in the Formulas), and are said to be coordinated to the atom. A coordination complex whose center is a metal atom is called a metal complex.

The maximum coordination number for a certain metal is thus related to the electronic configuration of the metal ion (the number of empty orbitals) and to the ratio of the size of the ligands and the metal ion. When the metal's coordination sites are filled by ligands, for example, the oxygen atoms of a glycol moiety or the nitrogen atoms of a nitrogen-glyme equivalent (nitrogen-glyme equivalent meaning the oxygen heteroatoms in the glyme are replaced with nitrogen heteroatoms, such as in TEMED for example) then the metal sites are saturated. Similarly, if the metal coordination sites of all the metals in a metallopolymer are mostly filled or filled then the metals in the metallopolymer are partially saturated, substantially saturated or saturated.

Metal saturation can be achieved by adding a sufficient amount or an excess amount of either a ligand or an additive, or combination thereof to the metallopolymer formulation chemistry. For example, the number of moles of glyme based on its molecular weight can be equivalent to or in excess to the number of metal coordination sites calculated for the synthesis of a metallopolymer. Alternatively, the synthesis of the metallopolymer can be based on the number of moles of the total number of heteroatoms in the glyme added, or the number of moles of the heteroatoms available for coordination in the glyme added.

The metals, ligands, heteroatoms, and functional groups in the metallopolymer coordination network of this disclosure provide electronic, hydrogen bonding, and Van der Waals interactions that trap or immobilize water molecules which result in formation of a gel in the hydrated metallopolymer having resilient elastic properties and self-healing properties even after many cycles of dehydration and rehydration.

The general synthesis of a metallopolymer in this disclosure is shown in Equation 1.

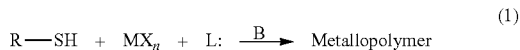
(1)

The synthesis is generally carried out by mixing an organothiol (R—SH) in base (B$^-$) and contacting the mixture with a metal salt (MX$_n$) under aqueous conditions. A ligand (L:) is then added, optionally in combination with an optional additive. A metallopolymer suspension forms which is collected as a gel, which may be desiccated to a desired a desired water content.

Embodiments of the Invention

In a first embodiment, a metallopolymer coordination network composition comprises a metallopolymer coordinated to one or more compounds of Formula A:

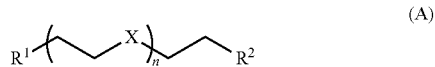
(A)

wherein
X is O or NR' wherein R' is H, alkyl, or aryl; R$^1$ and R$^2$ are each independently OH, alkoxy, or N(R$^a$)$_2$ wherein each R$^a$ is independently H or (C$_1$-C$_8$)alkyl; and n is 1, 2, 3, 4, or about 5 to about 50;

wherein the metallopolymer is a polymer of coinage metal atoms linked together by sulfur atoms of sulfur-containing moieties, wherein one or more of the sulfur-containing moieties comprise carboxy or amino functional groups.

In other embodiments, the composition further comprises water. The composition is a reversible gel. The gel has non-lamellar properties which can be restored after rehydration of the dehydrated gel. The composition has metal coordination sites for one or more of the coinage metal atoms which can be partially saturated, or saturated with moieties of Formula A. The elasticity of the gel ranges from about 15 MPa to about 40 MPa.

In various embodiments, the metallopolymer composition can be dehydrated to a semi-solid or a solid, or the semi-solid or the solid can be rehydrated to a gel or a fluid where the physical state of the metallopolymer interchanges reversibly from a metallopolymer fluid, a metallopolymer semi-solid, a metallopolymer solid, and a metallopolymer gel when adding or removing water.

In various other embodiments, the compound of Formula A is 1,2-dimethoxyethane, diethylene glycol dimethyl ether, triethylene glycol dimethyl ether, tetraethylene glycol dimethyl ether, polyethylene glycol having an Mn of about 200-400, monomethyl polyethylene glycol having an Mn of about 200-400, dimethyl polyethylene glycol having an Mn of about 200-400, 1,4-dioxane, or tetramethylethylenediamine (TEMED).

In a second embodiment, the sulfur-containing moieties (R—S) are linked to the coinage metals (M) as shown in Formula I:

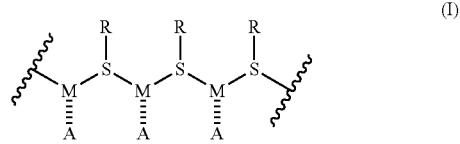
(I)

wherein each A of Formula I is coordinated to M of Formula I; and each R—S is a sulfur-containing diacid, amino acid, dipeptide, tripeptide, oligopeptide, or polypeptide.

In a further embodiment, each sulfur-containing moiety linking the coinage metals of Formulas IA-IC comprise thiomalic acid, glutathione, or cysteine;

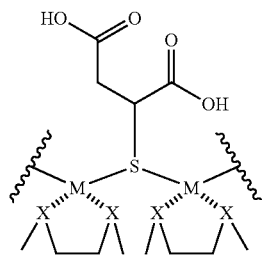
(IA)

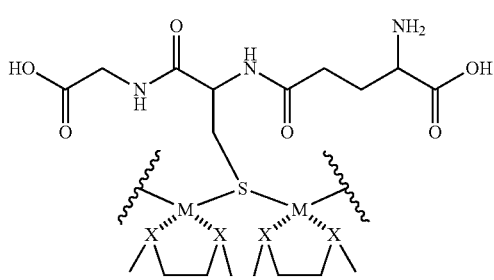
(IB)

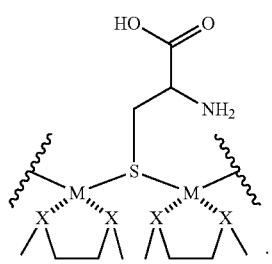
(IC)

In additional embodiments, two or more moieties of A of Formula A are cross-linked between two proximal coinage metals or between two or more distal coinage metals, or a combination thereof, as in Formulas ID-IF:

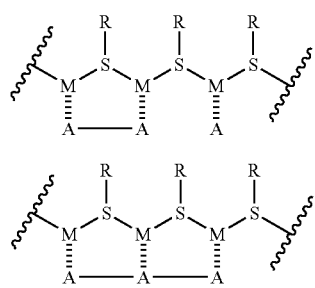
(ID)

(IE)

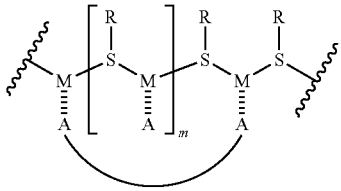
(IF)

wherein m is 1 to 10.

The oxygen atoms in each glyme moiety or the nitrogen atoms in each nitrogen-glyme equivalent moiety can coordinate to one or more metals in different configurations as shown in Formulas ID-IG as an example. One or more oxygen heteroatoms or one or more nitrogen heteroatoms of one glyme or one nitrogen-glyme equivalent moiety may coordinate to one metal in approximately a 1:1 ratio (the ratio of ligand to metal, Formula I). In other examples the ligand comprising more than one heteroatom has a longer length to allow one ligand to coordinate to two or more metals in the metallopolymer. The one longer ligand may coordinate to two (Formula ID) or more adjacent metals (Formula IE), it may coordinate to two or more metals that are spaced further apart as in Formula IF, or in all other possible configurations.

In a third embodiment, the composition comprises a complex of Formula IG:

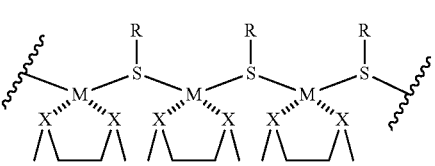
(IG)

wherein each M is copper, gold, or silver; each R is a sulfur-containing moiety wherein its sulfur atom is linked to M of Formula IG; and X is O or NMe; or wherein two or more moieties containing X form a group coordinated to the metals of the metallopolymer; wherein the composition is water soluble and electrically or ionically conductive.

In some embodiments X is O, in other embodiments M is copper. In additional embodiments R—S is thiomalic acid, glutathione, cysteine, or thioacetic acid.

In certain embodiments, the composition comprises about 40 wt % o to about 60 wt % water, wherein the composition is a fluid. In other embodiments, the composition comprises about 15 wt % o to about 40 wt % water, wherein the composition is a gel. In yet additional embodiments, the composition comprises no water, or about 0.1 wt % to about 15 wt % water, wherein the composition is a solid.

In any of the embodiments, the elasticity of the metallopolymer composition of is modified by additives in the composition, wherein the additive is bipyridine, phenanthroline, neocuproine, or polyvinyl alcohol.

In a fourth embodiment, the composition of a metallopolymer is represented by Formula II:

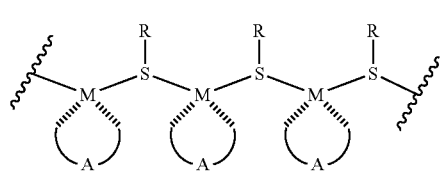

(II)

wherein
each M is copper, gold, silver, tin, nickel, aluminum, or titanium, each R is a sulfur-containing moiety comprising a carboxy or amino functional group wherein its sulfur atom is linked to M of the metallopolymer of Formula II; and one or more A moieties form Formula A:

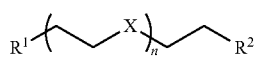

(A)

wherein
X is O or NR' wherein one or more X is coordinated to M of Formula II; R' is alkyl, methyl, ethyl, propyl, butyl, pentyl, cyclopropyl, cyclobutyl, or cyclopentyl; $R^1$ and $R^2$ are each independently OH, alkoxy, or $N(R^a)_2$ wherein each $R^a$ is independently H or $(C_1-C_8)$alkyl; and n is 1, 2, 3, 4, or about 5 to about 50;
wherein the metallopolymer further comprises immobilized water.

In various embodiments, the composition is a non-lamellar gel comprising about 15 wt % to about 40 wt % water.

In embodiments of the gel, the elasticity ranges from about 15 MPa to about 40 MPa.

In some particular embodiments, each M is copper or gold, each R—S is thiomalic acid or cysteine, each X is O, n is 2, 3 or 4, and $R^1$ and $R^2$ are H, alkoxy or $(C_1-C_8)$alkyl.

In other embodiments, the composition is electrically or ionically conductive.

In various embodiments of the composition, the number of repeating M-S moieties ranges from about 3 to about 50, e.g., about 3-10, about 5-20, about 10-30, or about 10-50.

In a fifth embodiment, a composition can be prepared by combining a metallopolymer having carboxy or amino functional groups (for example, in the R group of Formulas I, Formulas IA-IG, or Formulas II), or a combination thereof, and a molar excess of glyme, or a molar excess of a nitrogen-glyme equivalent, in water, to provide a metallopolymer coordination network composition wherein the composition is a non-lamellar gel.

Metallogels Through Glyme Coordination

It was discovered that coinage metal-thiolate polymers (CMTPs) form novel materials when synthesized in the presence of aqueous polyethylene glycol dimethoxy ethers (glyme, Gn). Glyme intercalation prevents the formation of 2D sheets normally observed in metal-thiolate complexes. Paradoxically, glyme incorporation strengthens the materials. Varying glyme chain length and water content provides explicit control over mechanical strength and visible absorption. All coinage metals are capable of forming homologous materials with a variety of thiolates containing carboxylic acid moieties (Table 1, FIG. 1). Copper-thiolate polymers were found to be versatile starting materials for preparation of the novel materials. For simplicity, the copper-thiomalic acid (Cu-TM) system, found to be representative, is further described herein.

TABLE 1

Reagents useful for forming metallogels.

| Metal Salt | Thiol | Glyme |
|---|---|---|
| copper(II) chloride dihydrate $(CuCl_2 \cdot 2H_2O)$ | glutathione (GSH) | 1,2-dimethoxyethane (G1) |
| silver(I) nitrate $(AgNO_3)$ | thiomalic acid (TM) | diethylene glycol dimethyl ether (G2) |
| gold(III) chloride trihydrate $(HAuCl_4 \cdot 3H_2O)$ | L-cysteine (Cys) | triethylene glycol dimethyl ether (G3) |
| | | tetraethylene glycol dimethyl ether (G4) |
| | | dimethyl polyethylene glycol $M_n \sim 250$ (G~5) |

Figure 2:
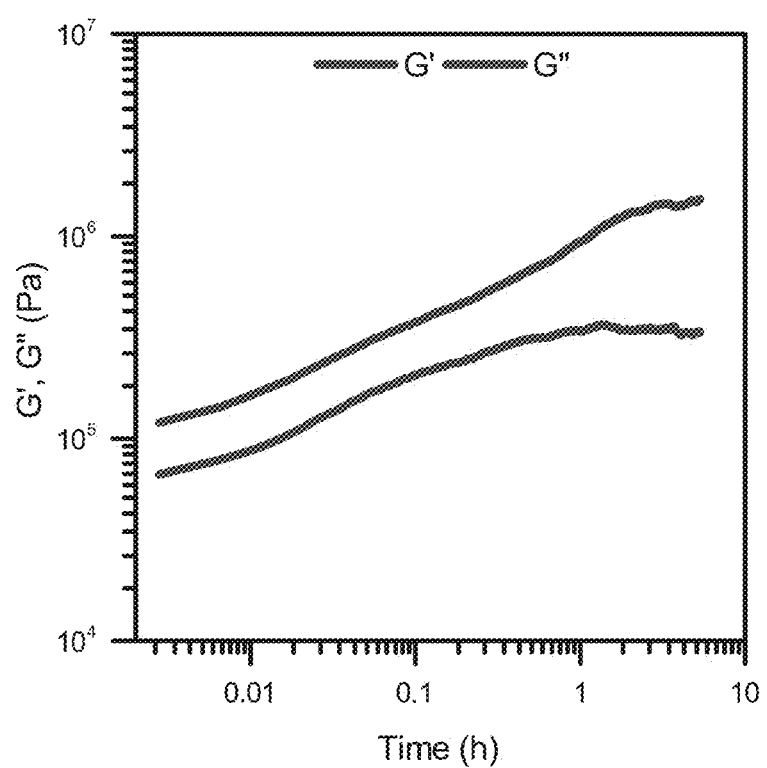
FIG. 2. Time sweep rheometry of Cu-TM/G1 shows elasticity increase as the sample dries in ambient conditions.

Metallopolymer was prepared by mixing $CuCl_2 \cdot 2H_2O$ with thiomalic acid (TM) in a 1:3 molar ratio. Immediate addition of a large molar excess of glyme precipitates a dense yellow phase (denoted as Cu-TM/Gn). The isolated material is a viscous liquid that consists of ca. 50 wt % water. Dynamic rheological studies corroborate a marked increase in elasticity as water evaporates (FIG. 2).

Due to its hygroscopic nature, the material changes form as water concentration reaches equilibrium with the relative humidity (RH) of its environment. After drying to ca. 30 wt % water the material exhibits gel-like behavior by supporting its own weight and surviving the "inversion test" (Kumar and Steed, Chem. Soc. Rev., 2014, 43, 2080-2088). The gels adopt a variety of solid forms contingent on how the remaining water is removed: freeze-drying forms powders, dropcasting forms thin films, and thermal treatment forms porous foams (FIG. 3). Independent of its solid form, rehydrating the material to ca. 30 wt % water reforms the original gel phase.

Figure 4A:
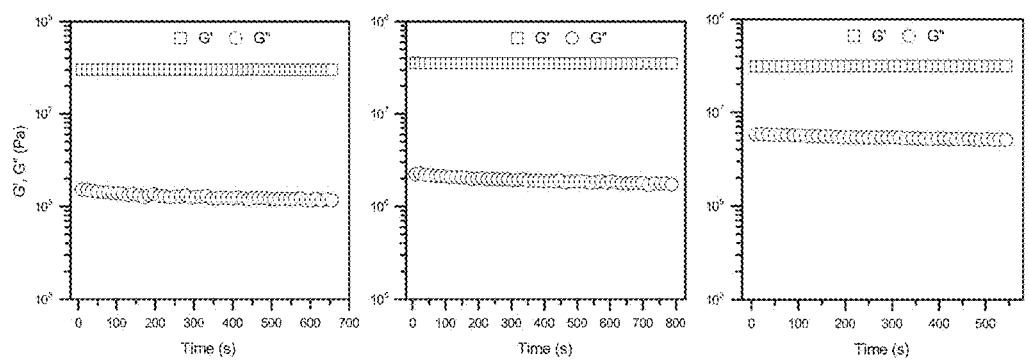
FIG. 4A-C. Representative Cu-TM/G1 curves used to obtain data in Table 2. (a) Time sweep on three separate samples prepared simultaneously. (b) Frequency sweep run at fixed strain ($\gamma=0.1\%$). (c) Strain sweep run at fixed frequency ($\omega=1$ Hz).
Figure 4B:
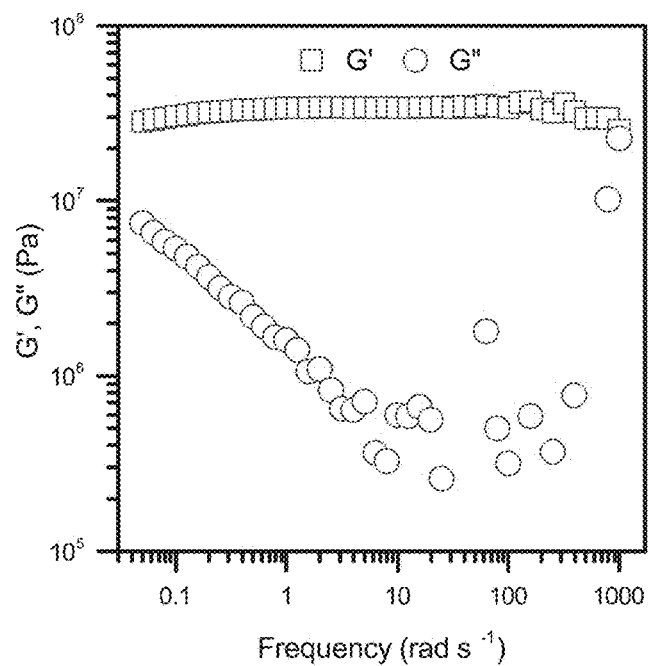
Figure 4C:
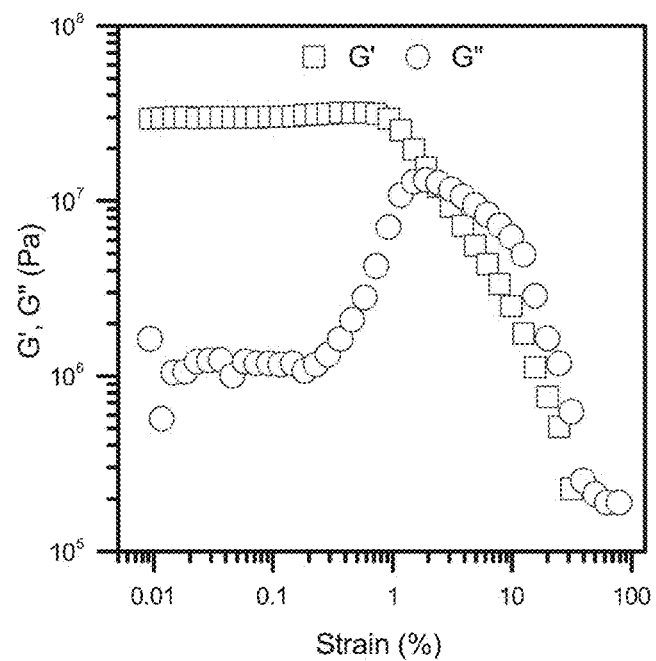

Time-dependent mechanical properties were probed by oscillatory strain rheometry to quantify the elastic (G') and viscous (G") moduli of the materials made with different glyme chain lengths. The gels were molded into rigid pucks by slow evaporation under 0% RH; this method is expected to preserve the hydrogen-bonded structure of water trapped in high molecular weight glyme films (Gemmei-Ide et al., Langmuir, 2006, 22, 2422-2425) and ensures homogeneity among samples. All samples display broadly similar behavior in each test. Rheometric properties are summarized in Table 2 and representative curves can be found in FIG. 4.

TABLE 2

Cu-TM/Gn rheometric properties.

| Sample | G' (MPa) | G" (MPa) | tan(δ) | Yield Point (%) |
|---|---|---|---|---|
| Cu-TM/G1 | 32.5 ± 2.72 | 2.75 ± 2.18 | 0.0854 ± 0.0695 | 2.27 |
| Cu-TM/G2 | 30.8 ± 1.82 | 2.72 ± 1.63 | 0.0864 ± 0.0492 | 2.78 |
| Cu-TM/G3 | 30.4 ± 1.27 | 2.54 ± 1.62 | 0.0825 ± 0.0499 | 2.66 |
| Cu-TM/G4 | 22.1 ± 0.505 | 0.735 ± 0.251 | 0.0330 ± 0.0107 | 2.14 |
| Cu-TM/G~5[a] | 17.3 ± 2.38 | 1.13 ± 0.243 | 0.0646 ± 0.0056 | 5.41 |

[a]G~5: $M_n \approx 250$ g mol$^{-1}$

G' is approximately an order of magnitude greater than G" within the linear viscoelastic range, which validates the solid-like nature of the gel. Frequency sweep rheometry further confirms elastic behavior (G'>G") over all time scales probed. The material behaves as a viscoelastic solid at low strain amplitudes until the yield point (G'=G") at 2-5% applied stress. At this point, the molecular network is disrupted and the material starts to flow. Each sample shows an increase in G" prior to the yield point, suggesting a change in the molecular structure that results in network disintegration.

Figure 5:
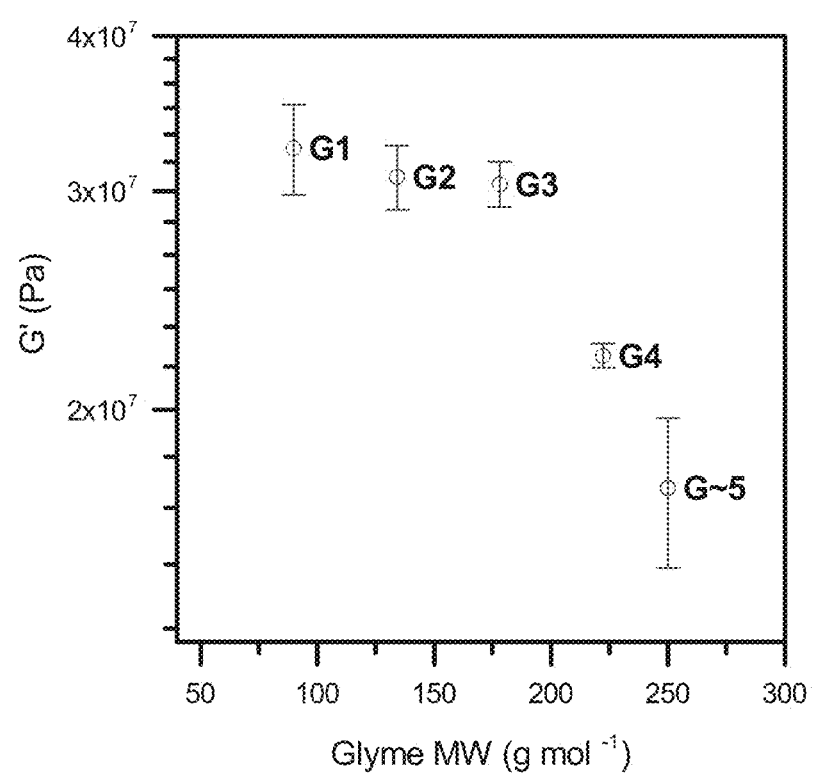
FIG. 5. Comparison of Cu-TM/Gn elastic moduli.

Increasing glyme chain length results in a significant decrease in magnitude of G' (FIG. 5). Cu-TM/G1 affords the highest G' at 32.5 MPa, and G' decreases incrementally with increasing glyme chain length to 17.3 MPa with Cu-TM/G~5 (G~5: $M_n \approx 250$ g mol$^{-1}$). The large overall difference of 15.2 MPa indicates that longer glymes produce weaker network architectures. This relationship between glyme size and network strength suggests the existence of an ideal network that is preferential towards shorter glymes. Metallopolymer chain length cannot be precisely determined because the metallopolymer must be synthesized in the presence of glyme to precipitate the material (vide infra). For the purpose of this study, metallopolymer chain length is assumed to be approximately equivalent across all Cu-TM/G because the ligand and solution pH are constant throughout runs.

Network structure influences mechanical properties of materials. X-ray diffraction (XRD) (Liu et al., *J. Mater. Chem.*, 2011, 21, 19214; Bensebaa et al., *Langmuir*, 1998, 14, 6579-6587; Bensebaa et al., *Canadian Journal of Chemistry*, 1998, 1654-1659; Parikh et al., *J. Phys. Chem. B*, 1999, 103, 2850-2861) and small-angle X-ray scattering (SAXS) (Söptei et al., *Colloids and Surfaces A: Physicochemical and Engineering Aspects*, 2015, 470, 8-14) studies on CMTPs synthesized without glyme underlie models of metallophilic interactions that enforce metallopolymer self-assembly in 2D sheets. Scanning electron microscopy (SEM) studies are consistent with XRD and SAXS and furthermore reveal porous 2D microplates. The boundaries between sheets in the resulting lamellar structures represent defect sites that may shear under external force. Typical G' values are on the order of 10 Pa, though modification through crosslinking can increase G' up to thousands of Pascal while maintaining sheet structure (de Luzuriaga et al., *J. Polym. Sci. Part A: Polym. Chem.*, 2015, 53, 1061-1066).

Figure 6:
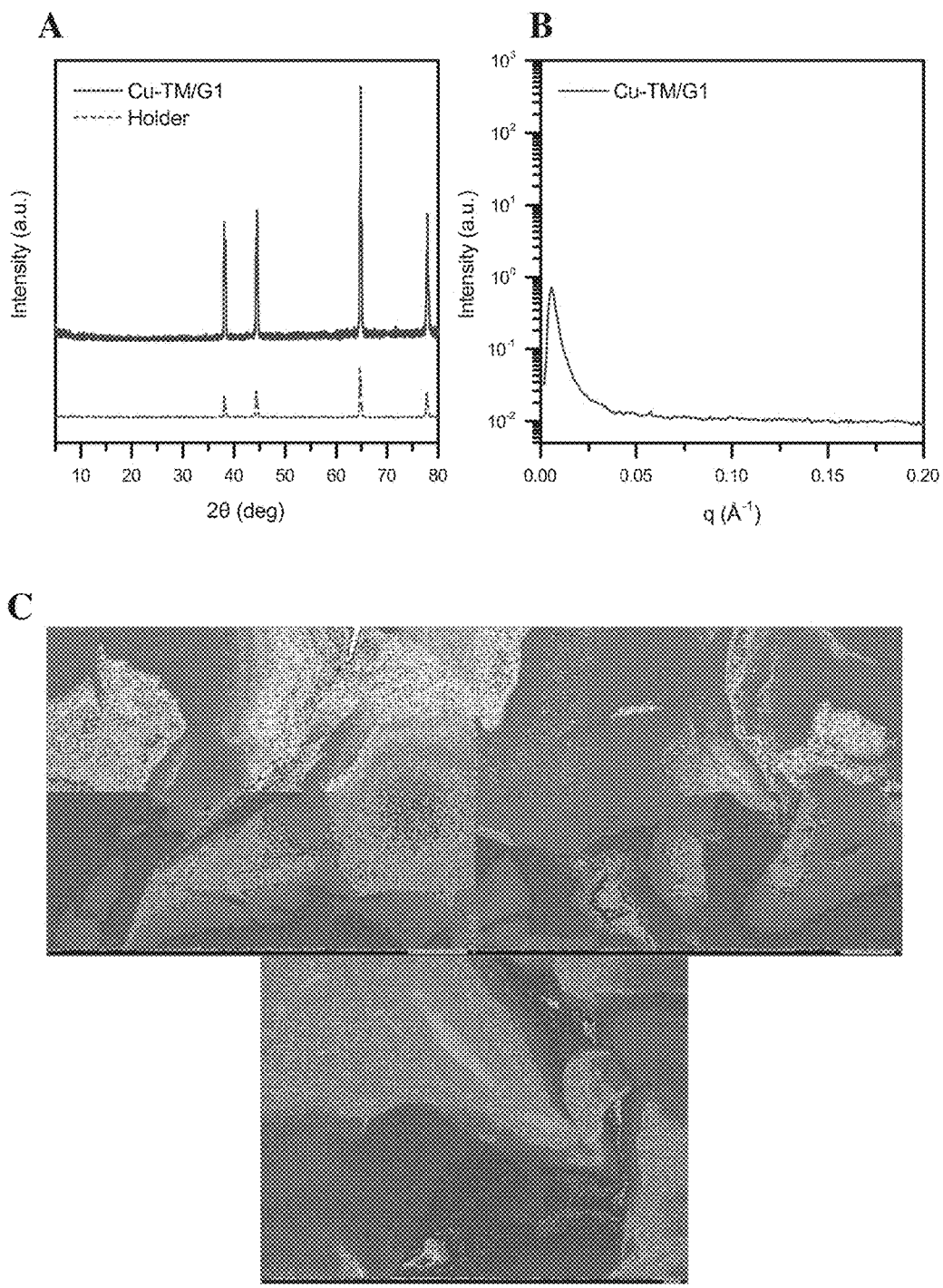
FIG. 6A-C. (a) XRD of the sample (upper line) only shows diffraction peaks attributed to the sample holder (dashed lower line). (b) SAXS displays one feature ($q=0.25$) that is an artifact at the edge of the detector; no other diffraction peaks are apparent. (c) SEM micrographs of Cu-TM/G1 display a uniform surface around cracks that formed as the sample dried. Scale bar is 1 µM for the top two images and 100 nm for the bottom image.

In the present system, XRD, SAXS, and SEM on glyme-containing CMTPs do not reveal sheet-like structures (FIG. 6). These studies jointly indicate that glyme intercalation enforces an amorphous network. Metallophilic interactions underlie the 2D sheets previously observed (Söptei et al., *Colloids and Surfaces A: Physicochemical and Engineering Aspects*, 2015, 470, 8-14), indicating that glyme must be interacting with the metallopolymer in a way that prevents this interaction and assembly. A model that accounts for this observation is one in which glyme chelates the metal in the backbone of the metallopolymer (Scheme 1).

Scheme 1. G1 chelates the metal in a metallopolymer backbone wherein the hard block includes a coinage metal and a thiol compound that terminates in carboxy moieties, wherein the thoil compound links atoms of coinage metal together in the metallopolymer, and the wavy line between S and the carboxylate group is an alkyl chain or the remaining atoms of sulfur-containing amino acid.

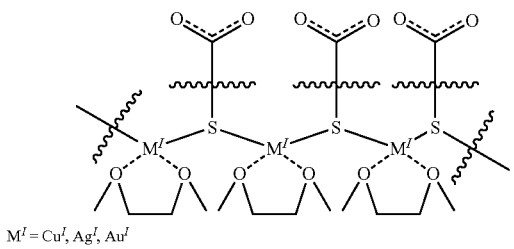

$M^I$ = $Cu^I$, $Ag^I$, $Au^I$

This concept hinges on the chelation ability of glymes and is consistent with recent work on polyether coordination to metals in multinuclear complexes (Mishra et al., *Dalton Trans.*, 2012, 41, 1490-1502; Chevrier et al., *Dalton Trans.*, 2013, 42, 217-231). Distortion of the metal coordination sphere influences metallophilic interactions and prevents metallopolymer assembly into sheets. G' on the order of $10^7$ Pa suggests that the amorphous network is less susceptible to shear than previously reported CMTPs.

Figure 7:
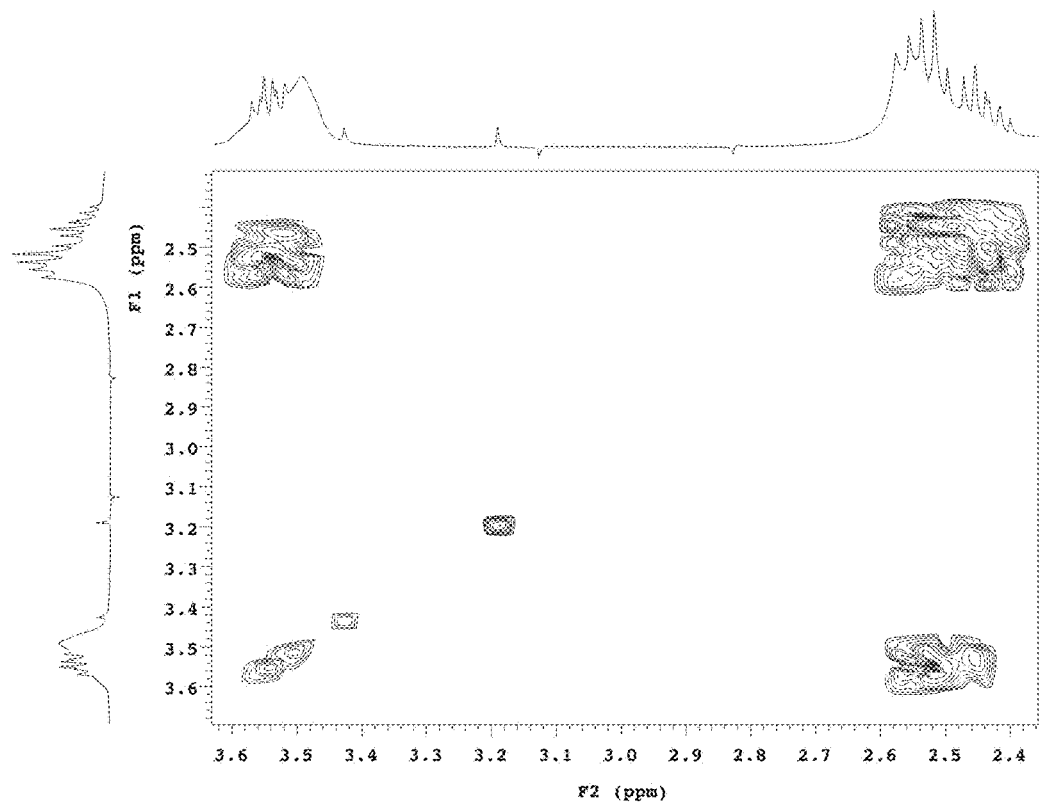
FIG. 7. $^1$H-$^1$H correlation spectroscopy of Cu-TM/G1 synthesized in $D_2O$. The peaks at 3.2 and 3.4 ppm correspond to G1 and all other peaks correspond to metallopolymer. The absence of off-diagonal peaks between G1 and metallopolymer indicates that G1 interacts non-covalently with the metallopolymer.
Figure 8:
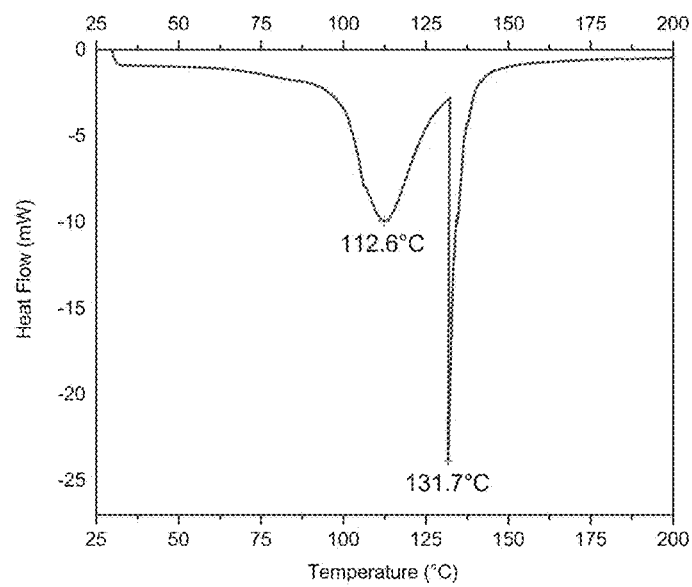
FIG. 8. Differential scanning calorimetry of freshly synthesized Cu-TM/G1 differentiates between free solvent water (low temperature) and water trapped in the molecular network (high temperature). These peaks are attributed to water loss because they are irreversible and are not apparent in desiccated material. The sample pan was re-weighed after the run to determine 3.7 mg of water (59 wt %) was lost during the experiment.

The metallopolymer is insoluble in neat glyme, but synthesis in the presence of aqueous glyme allows the polymers to form a metallopolymer coordination network. $^1$H-$^1$H correlation spectroscopy provides evidence that polymer chains interact through non-covalent forces (FIG. 7). Water conceivably permits glyme penetration into the metallopolymer network and the large molar excess of glyme (e.g., 385 equivalents of G1 to Cu) subsequently drives precipitation of the material. The resulting viscous liquid consists of roughly 50% water, and differential scanning calorimetry (DSC) indicates the presence of water as free solvent and trapped in the network (FIG. 8). The degree of polymer interaction is dictated by water content: the network condenses as the material dries, resulting in increased elasticity and marked color changes.

Figure 9:
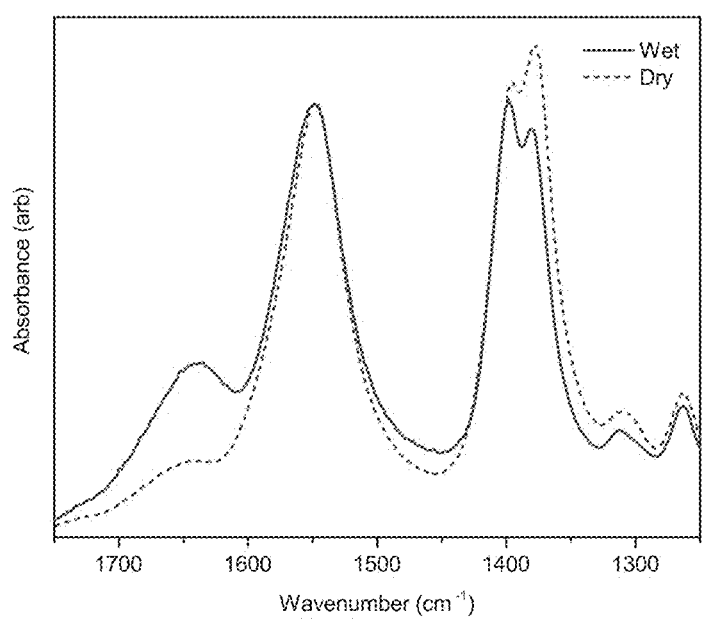
FIG. 9. Infrared spectroscopy of freshly synthesized Cu-TM/G1 (solid blue line) and after drying for 12 h (dashed green line). The peak at 1548 $cm^{-1}$ (carbonyl stretch) does not shift in energy while the sample dries and implies that the carboxylate environment remains unchanged. The peaks at ~1380 $cm^{-1}$ (glyme ether stretch) display a shift in relative intensity, which indicate the local environment of glyme ether changes while the sample dries.

Fourier transform infrared spectroscopy (FTIR) studies exhibit a constant carbonyl stretch at 1548 cm$^{-1}$ as the sample dries (FIG. 9), which indicates that the carboxylate environment remains unchanged. There are two glyme ether peaks centered around 1380 cm$^{-1}$ that shift in intensity as the sample dries. This result implies that glyme exists in two concentration-dependent forms and suggests the polymers are bound through metal-glyme coordination rather than carboxylate-glyme interactions.

The concentration-dependence on network structure is observable through changes in visible absorbance, which is strongly influenced by metallophilic interactions and the nature of the metal coordination sphere. UV-Visible spectroscopy (UV-Vis) shows a single absorption ($\lambda_{max}$=414 nm) for Cu-TM/G1 as-synthesized, and periodic monitoring of the drying sample reveals a bathochromic shift (smoothed data in FIG. 10a, raw data in FIG. 11a). This is a characteristic of a change in the metal coordination environment as water evaporates. The result indicates the metal is initially ligated by water, and glyme coordination follows as water is lost and the network condenses.

Interestingly, varying glyme chain length in Cu-TM/Gn results in minimal change in $\lambda_{max}$ over the range of 403-418 nm (smoothed data in FIG. 10b, raw data in FIG. 11b). Such a minor change in linear absorption suggests that all glymes have similar coordination to the metal. This appears counterintuitive, since binding affinity generally increases with glyme length and number of binding sites (Johansson et al., *Polymer*, 1999, 40, 4399-4406; Terada et al., *Phys. Chem. Chem. Phys.*, 2014, 16, 11737; Tang and Zhao, *RSC Adv.*, 2014, 4, 11251). However, it is likely that the metal reaches coordinative saturation, where steric constraints prevent coordination from all available oxygens. The limited solvent accessibility of the metal generates similar coordination environments for all glymes independent of chain length.

Rheological studies support coordinative saturation and propose that G1 produces the strongest network. Longer glymes introduce non-coordinating oxygens that extend past the primary coordination sphere of the metal. This effectively produces polyethylene side chains that branch out into the molecular network and add rotational degrees of freedom that bestow increased flexibility. The tail ends of glyme could also coordinate two metal centers to create physical crosslinks between metallopolymers. The relatively small differences in G' between materials made with G1-G3 indicate that these chains are too short to noticeably contribute to this effect. The critical chain length appears to be G4, as there is a substantial decrease in G' upon G4 intercalation that continues with G~5. This complements the benchtop observation that longer glymes form more fragile gels. It has not yet been determined whether this trend continues to longer glymes that could coordinate to three or more metal centers, as this may strengthen the molecular network.

Thus, coinage metal-thiolate polymers form a metallopolymer coordination network when synthesized in the presence of glymes. The data support that glyme chelates the metal in the metallopolymer backbone. This interaction prevents metallopolymer crystallization and results in a wholly amorphous material that is stronger than previously reported coinage metal-thiolate supramolecular hydrogels synthesized without glyme. Varying glyme chain length and water content dictates the extent of polymer interaction and affects the mechanical and optical properties of the material. Though this report establishes a novel approach toward metallopolymer gelation using Cu-TM/Gn systems, an extension to other coordination metal polymers is currently under investigation.

Few other reversible interpenetrating or metallopolymer coordination networks or resins are known to exist, all of which require more extraneous variables (acidic conditions, UV-light) besides simply the addition of water. The CMTP material described herein can exist in a variety of morphologies, which allows for a large variety of applications.

Commercial Applications

Commercial applications of glyme-mediated metallogel containing coinage metal-thiolate polymers (CMTPGn) include (1) adhesives, (2) conductive inks, (3) transparent conductors, and (4) electrolytes, among others.

1. Adhesives.

Adhesive properties of the material are being studied in the Coinage-TM/Gn system. Pull-off strength tests can be performed on a variety of substrates. XPS depth profiling and SEM studies can elucidate material surface structure and determine what substrates the material can bind to. Alterations to metallopolymer composition and network architecture can increase bond strength and allow the material to adhere to new surfaces. Bond strength can be measured as a function of hydration to determine the effects of a humid atmosphere. Plasticizers can be used to moderate humidity effects and to develop new processing parameters. The deliverable product can be a cost-effective adhesive with comparable bond strength to commercial adhesives. The product can be fully functional in standard atmospheric conditions.

Due to the intrinsic electronic conductivity of the material, it can also be used as an electrically conductive adhesive (ECA). These function as an alternative to tin-lead solder to provide a conductive pathway to connect one circuit element to another. Their application is currently limited because no commercialized ECAs can compete with the electrical conductivity and impact strength of tin-lead solder. The Coinage-TM/Gn system material is currently only known to bind to metal and glass surfaces. This disclosure provides compositions that be used for an ECA which has the electrical, mechanical, and thermal properties and additionally the impact strength needed for commercialization through alteration of metallopolymer composition and network structure.

2. Conductive Inks.

Conductive inks are electrically conductive liquids that are printed directly onto a substrate and cured in situ. The substrate can be any object the ink can adhere to, and the inks are commonly composed of conductive materials like flaked silver or carbon nanomaterials. Printed electronics are more economical than traditional industrial standards for many applications, such as RFID tags used in modern transit tickets or windshield defrosters. Recently, conductive inks have found use in additive manufacturing, which allows circuits to be printed in conjunction with plastics and obviates the need for conventional circuit boards.

The Coinage-TM/Gn system material is a viable conductive ink due to its intrinsic electronic conductivity and is printable due to its tunable viscosity via plasticizers and varying water content. The deliverable products are 3D-printed circuits capable of self-healing through the addition of water. Optimizing processing parameters of the material can provide unique applications for extruded material.

3. Transparent Conductors.

Transparent conductors (TCs) are electrically conductive materials that are highly transparent to visible light. This property allows current collection in solar cells, alteration of electrical charge in electrochromic "smart windows," and use in other optoelectronic devices. The most common TC, indium-tin-oxide (ITO), requires the scarce and very expensive element indium. Several other metal oxide semiconductors are hopeful alternatives to ITO, but they require further development of deposition techniques to enable the preparation of thin films.

The Coinage-TM/Gn system material is electrically conductive and inexpensive. It is trivial to form into thin films, and the addition of plasticizers can allow for control over film morphology. The material is transparent, especially in thin films, though its color can decrease the ability to transmit all visible light. Because color is a function of metallopolymer composition and network structure, tuning these parameters can provide for a colorless, transparent material. The deliverable product is a very inexpensive TC made from earth-abundant materials that can find use in optoelectronics and dye-sensitized solar cells.

4. Electrolyte.

An electrolyte is an ionically conductive substance that allows the flow of ions between electrodes. In batteries, ions move from the cathode to the anode when charging and in reverse on discharge. This process completes the circuit and allows the flow of electrons. A separator is an electric insulator that physically separates the cathode and anode to prevent a short circuit.

Although the subject of intense study, the ideal Li-ion battery electrolyte has not yet been developed. For a consumer battery system to function well a conductivity of at least $10^{-3}$ S cm$^{-1}$ at room temperature is needed. Viscosity, salt concentration, ion association and ion-solvent interactions must be optimized to maximize ion transport in electrolytes. For the coinage-TM/Gn system material, viscosity and salt concentration are easily controlled, while ion association and ion-solvent interactions can be tuned through varying material composition. As an added benefit, the metallogel can replace the separator and electrolyte in one material since it can have no electric conductivity in this application. The deliverable product is a safer, cheaper battery with high ionic conductivity.

5. Further Applications.

The coinage-TM/Gn system material can also be used for seed coatings, seed tape, water-soluble packaging, tablet binders, gel capsule coatings, controlled release matrix systems, bioadhesives, magnetic paints, protective coatings, and components for batteries, fluorescent lamps, and circuitry.

Methodology.

A general approach toward product development is to: (i) establish composition-dependent behavior of metallopolymer, (ii) shape network architecture through structural adjustments to glyme; (iii) use plasticizers to augment desirable properties. As such, the metallopolymer composition establishes the fundamental properties of the material that are optimized through subsequent refinements of the molecular network.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Materials.

All chemicals were obtained from commercial suppliers and used without further purification unless otherwise noted. Copper(II) chloride dihydrate (ACS Reagent, ≥99.0%), thiomalic acid (ReagentPlus, ≥99%), diethylene glycol dimethyl ether (ReagentPlus, 99%), tetraethylene glycol dimethyl ether (≥99%), and poly(ethylene glycol) dimethyl ether (average $M_n$~250) were obtained from Sigma-Aldrich. 1,2-Dimethoxy ethane (99+% stab, with BHT) and triethylene glycol dimethyl ether (99%) were obtained from Alfa Aesar. Filters used were VWR syringe filters, 0.2 μM cellulose acetate.

Instrumentation.

Oscillatory shear measurements were performed on a TA Instruments ARES rheometer. Dynamic frequency sweeps were performed for each sample using a 0.1% shear strain (verified linear viscoelastic region) over a frequency range of 0.05 to 1000 rad s$^{-1}$. Strain sweeps were performed for each sample at 1 rad s$^{-1}$ over a range of 0.01 to 90%.

Small angle X-ray scattering (SAXS) data were collected on a Rigaku S-Max 3000 High Brilliance 3 Pinhole SAXS system outfitted with a MicroMax-007HFM Rotating Anode (CuKα), Confocal Max-Flux™ Optic, Gabriel Multiwire Area Detector and a Linkham thermal stage. The feature at q=0.25 is an artifact at the edge of the detector.

X-ray diffraction (XRD) was performed on a Scintag X-2 Advanced Diffraction system equipped with CuKα radiation (λ=1.54 Å). Scanning electron microscopy (SEM) was performed on a JEOL JSM-6500F microscope operating at an accelerating voltage of 15 kV.

UV-Visible spectroscopy (UV-Vis) was performed on a Nanocrop 2000c Spectrophotometer on a 1-mm path length pedestal. Data were smoothed under Savitzky-Golay method with a 10-point window to make trends more apparent (raw data available in FIG. 4).

Example 1. Metallogels Through Glyme Coordination

Cu-TM/G1 Synthesis.

A 100 mM solution of thiomalic acid (1.2 mmol, 3 eq., in 12 mL 0.3 M NaOH) and 100 mM solution of CuCl$_2$.2H$_2$O (0.4 mmol, 1 eq., in 4 mL H$_2$O) were filtered. The thiol solution was added to the blue copper chloride solution in a 50-mL polypropylene centrifugation tube and turned the solution black. 1,2-Dimethoxyethane (G1, 12 mL) was immediately added, and the resulting cloudy white suspension was shaken at 4° C. for 45 min or until a dense yellow phase was apparent. After centrifugation at 3220 g for 10 min at 4° C. the clear, colorless supernatant was siphoned off of the viscous yellow liquid.

Only the bottom portion of the liquid was used in experimentation to be sure no residual solvent was brought over into the final product.

Cu-TM/G2-5 Synthesis.

All glymes studied (G2-G~5) are capable of substituting for G1 as described for the synthesis of Cu-TM/G1. Other metal salts and thiolates (e.g., examples found in Table 1) are replaceable with one minor alteration to the synthetic method: 18 mL of glyme should be added when using glutathione or cysteine in place of thiomalic acid.

A 1:3 metal:thiol ratio is important to prepare optimally formed material regardless of the metal oxidation state (i.e., 3 equivalents of AgNO$_3$ are important to form Ag—SR/Gn despite Ag(I) already in the necessary+1 oxidation state).

Example 2. Rheometry Sample Preparation

Immediately after its synthesis, 150 μL of the viscous liquid CMTP was transferred into an 8-mm diameter rubber mold on parafilm. After drying for 24 h in ambient laboratory conditions it was transferred to a desiccator (RH=0%) and dried for another 24 h at ambient temperature and pressure. This method allowed water to slowly diffuse out of the gel to evaporate and prevented the material from cracking. The resulting puck fits perfectly under the 8-mm top plate on the rheometer. This method provided reproducible and accurate rheological measurement of the material.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and pre-

What is claimed is:

1. A metallopolymer coordination network composition comprising a metallopolymer of Formula I:

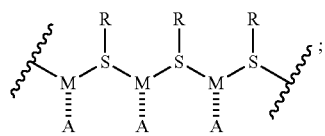
(I)

wherein
M is a coinage metal;
R—S is a sulfur-containing moiety wherein the ratio (R—S):M is 1:1; and
Formula I is coordinated to one or more compounds of Formula A:

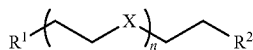
(A)

wherein
each A of Formula I is a Formula A moiety coordinated to M of Formula I;
X is O or NR' wherein R' is H, alkyl, or aryl;
$R^1$ and $R^2$ are each independently OH, alkoxy, or $N(R^a)_2$ wherein each $R^a$ is independently H or ($C_1$-$C_8$)alkyl; and
n is 1, 2, 3, 4, or about 5 to about 50;
wherein the metallopolymer is a polymer of coinage metal atoms linked together by the sulfur atoms of the sulfur-containing moieties, wherein one or more of the sulfur-containing moieties comprise carboxy or amino functional groups.

2. The composition of claim 1 further comprising water.

3. The composition of claim 2 wherein the composition is a reversible gel.

4. The gel of claim 3 wherein its gel properties are restored after rehydration of the dehydrated gel.

5. The composition of claim 1 wherein the coordination sites of one or more of the coinage metal atoms are partially saturated, or saturated with moieties of Formula A.

6. The composition of claim 1 wherein the compound of Formula A is 1,2-dimethoxyethane, diethylene glycol dimethyl ether, triethylene glycol dimethyl ether, tetraethylene glycol dimethyl ether, polyethylene glycol having an Mn of about 200-400, monomethyl polyethylene glycol having an Mn of about 200-400, dimethyl polyethylene glycol having an Mn of about 200-400, 1,4-dioxane, or tetramethylethylenediamine (TEMED).

7. The composition of claim 1 wherein
each R—S moiety of Formula I is a sulfur-containing diacid, amino acid, dipeptide, tripeptide, oligopeptide, or polypeptide.

8. The composition of claim 7 wherein each sulfur-containing moiety linking the coinage metals of Formulas IA-IC comprise thiomalic acid, glutathione, or cysteine;

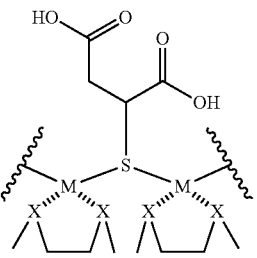
(IA)

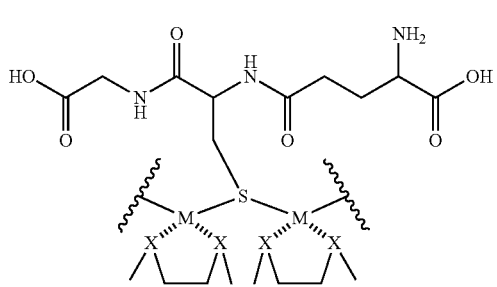
(IB)

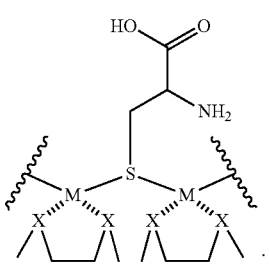
(IC)

9. The composition of claim 7 wherein two or more moieties of A of Formula I are cross-linked between two proximal coinage metals or between two or more distal coinage metals, or a combination thereof, as in Formulas ID-IF:

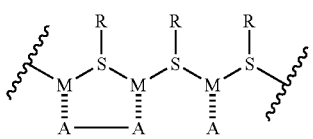
(ID)

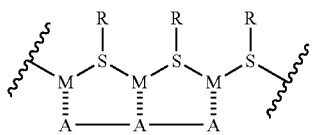
(IE)

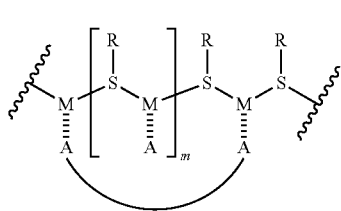
(IF)

wherein m is 1 to 10.

10. The composition of claim 1 wherein the composition comprises a complex of Formula IG:

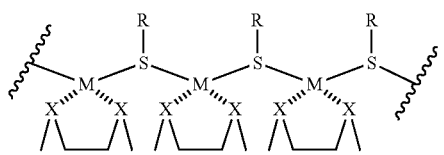

(IG)

wherein
  each M is copper, gold, or silver;
  each R is a sulfur-containing moiety wherein its sulfur atom is linked to M of Formula IG; and
  X is O or NMe; or wherein two or more moieties containing X form a group coordinated to the metals of the metallopolymer;
  wherein the composition is water soluble and electrically or ionically conductive.

11. The composition of claim 10 wherein X is O.

12. The composition of claim 11 wherein M is copper.

13. The composition of claim 12 wherein R—S is thiomalic acid, glutathione, cysteine, or thioacetic acid.

14. The composition of claim 10 comprising about 40 wt % to about 60 wt % water, wherein the composition is a fluid.

15. The composition of claim 10 comprising about 15 wt % to about 40 wt % water, wherein the composition is a gel.

16. The composition of claim 10 comprising about 0.1 wt % to about 15 wt % water, wherein the composition is a solid.

17. A metallopolymer composition of Formula II:

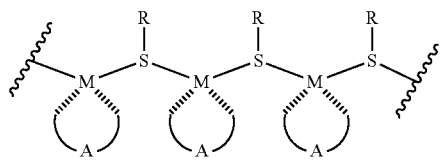

(II)

wherein
  each M is copper, gold, silver, tin, nickel, aluminum, or titanium;
  each R is a sulfur-containing moiety comprising a carboxy or amino functional group wherein its sulfur atom is linked to M of the metallopolymer of Formula II; and
  each A is Formula A:

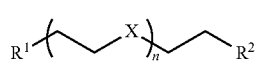

(A)

wherein
  X is O or NR' wherein one or more X is coordinated to M of Formula II;
  R' is alkyl, methyl, ethyl, propyl, butyl, pentyl, cyclopropyl, cyclobutyl, or cyclopentyl;
  $R^1$ and $R^2$ are each independently OH, alkoxy, or $N(R^a)_2$ wherein each $R^a$ is independently H or $(C_1$-$C_8)$alkyl; and
  n is 1, 2, 3, 4, or about 5 to about 50;
  wherein the ratio of the sulfur containing moiety and M is 1:1, the metallopolymer is a straight chain metallopolymer further comprising immobilized water, and the composition is electrically or ionically conductive.

18. The composition of claim 17 wherein the composition is a non-lamellar gel comprising about 15 wt % to about 40 wt % water.

19. The composition of claim 18 wherein each M is copper or gold, each R—S is thiomalic acid or cysteine, each X is O, n is 2, 3 or 4, and $R^1$ and $R^2$ are H, alkoxy or $(C_1$-$C_8)$alkyl, and elasticity ranges from about 15 MPa to about 40 MPa.

20. The composition of claim 19 wherein the number of repeating M-S moieties is about 3 to about 50.

21. A composition according to claim 1 prepared by combining a metallopolymer having carboxy or amino functional groups, or a combination thereof, and a molar excess of glyme, or a molar excess of a nitrogen-glyme equivalent, in water, to provide a metallopolymer coordination network composition wherein the composition is a non-lamellar gel.

* * * * *